July 11, 1933.　　　S. P. LARSON　　　1,917,767
PAN GREASING MACHINE
Filed March 2, 1931　　　2 Sheets-Sheet 1
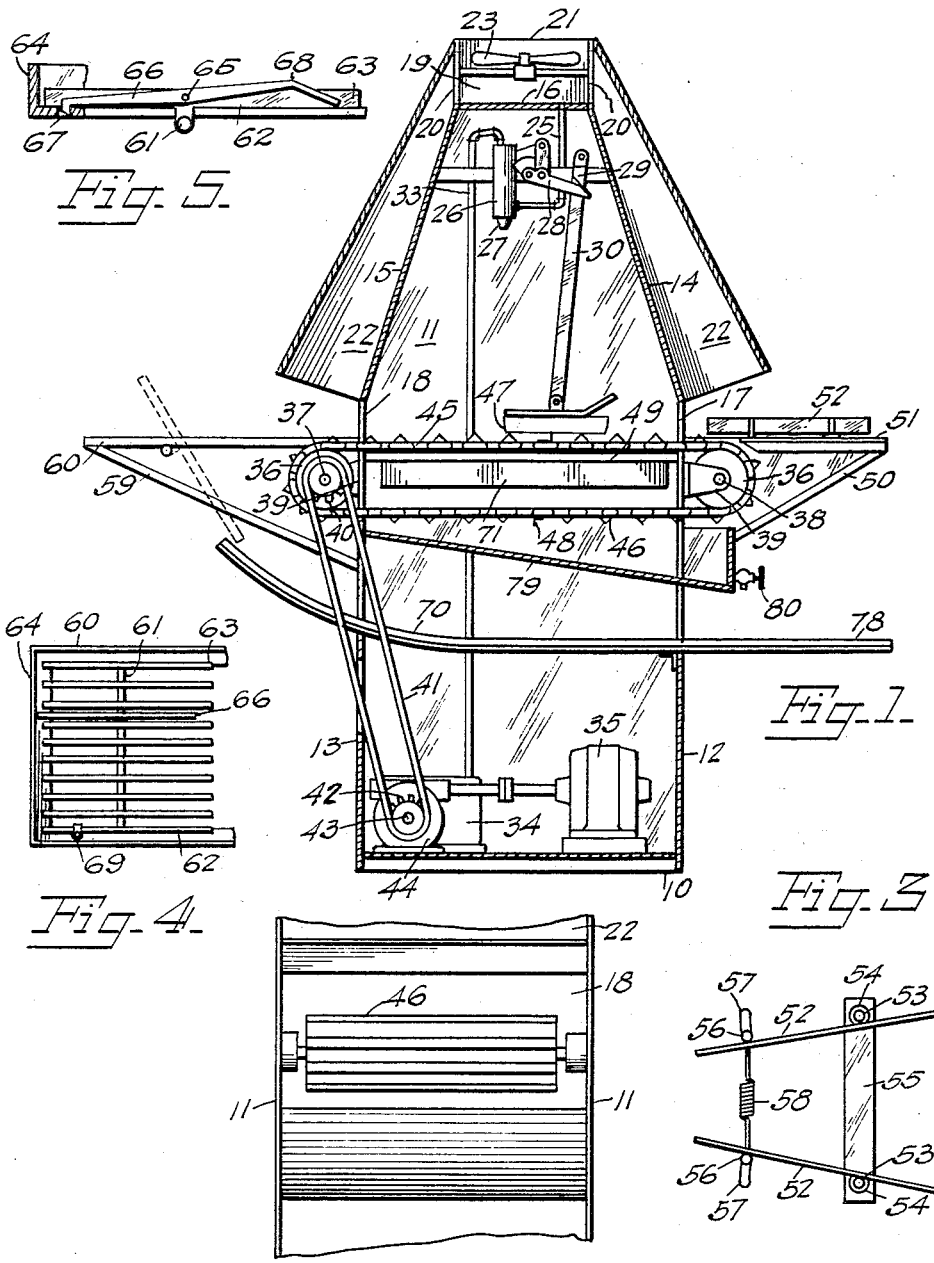

July 11, 1933.  S. P. LARSON  1,917,767
PAN GREASING MACHINE
Filed March 2, 1931    2 Sheets-Sheet 2
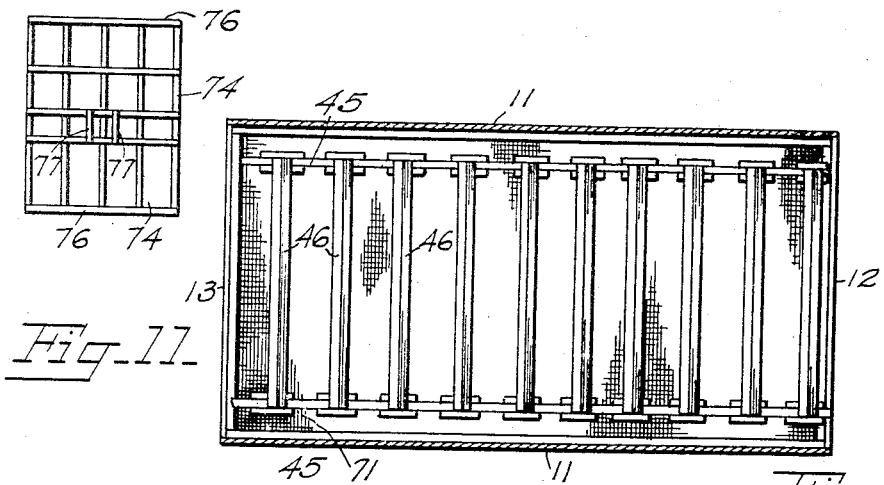
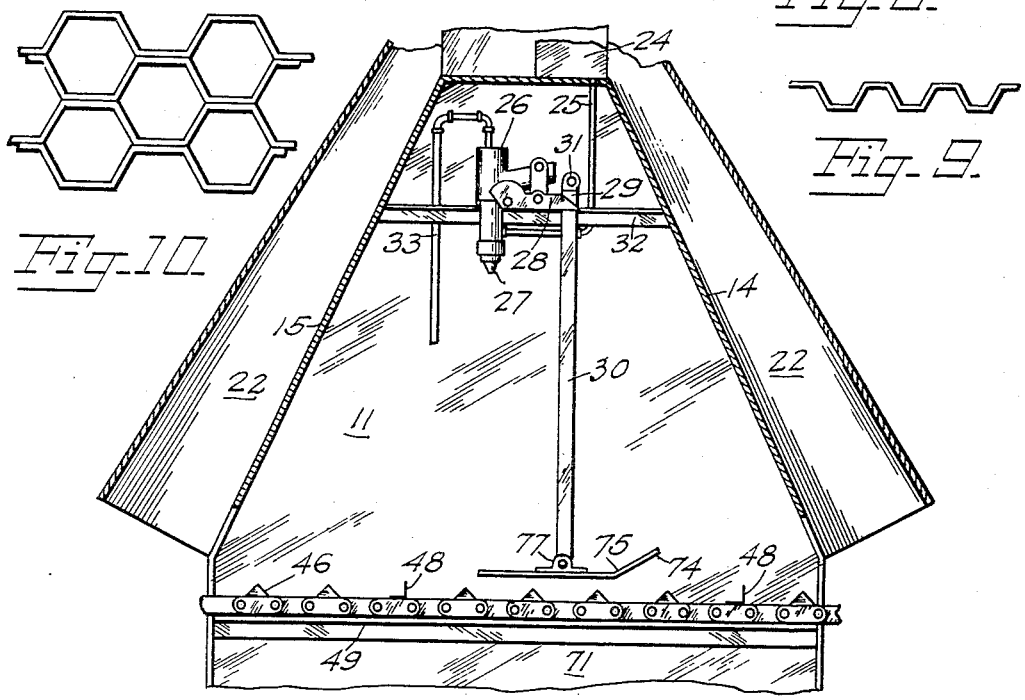
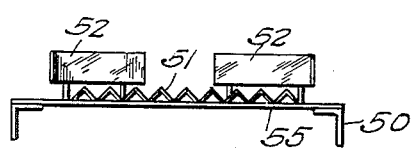
INVENTOR.
Sven P. Larson
BY
Harry C. Schroeder
ATTORNEYS.

Patented July 11, 1933

1,917,767

UNITED STATES PATENT OFFICE

SVEN P. LARSON, OF BERKELEY, CALIFORNIA

PAN GREASING MACHINE

Application filed March 2, 1931. Serial No. 519,397.

This invention is an improved pan greasing machine, which is specially adapted to use in small baking establishments, for greasing bread pans.

The main object of the invention is to provide a machine which is self contained, having all operating elements incorporated within the machine, and which may be connected in the usual electric circuit by the usual attachment plug for operation.

Another object of the invention is to provide a machine of the class described which will deposit a uniformly even and complete film of oil or fat on the inner surface of a pan without any deposit thereof on the exterior of the pan, thereby obviating the smoke nuisance within the oven, and keeping the pan clean and sanitary.

A further object of the invention is to provide the machine outlined with an efficient atomizer for the oil and which may be of any standard make which will produce an extremely fine mist, projecting no globules which would tend to deposit on the exterior of the pan.

A still further object of the invention is to provide the machine outlined with a conveyor which will offer only point or edge contacts to the pans sent through the machine, and which will shed any oil deposited thereon, and to additionally provide, below the feed level of the pans an efficient condenser for the excess vapors, as also a collecting receptacle for the condensed vapors or mist.

Another object of the invention is to provide a gravity operated return for the pans, whereby, after greasing, the pan is automatically returned by gravity to the feed end of the machine providing one man operation, as also to provide a centering device for the pans at the feed end of the machine.

Another object of the invention is to provide the machine with forced draft ventilation by providing uptake hoods at the feed and discharge ends of the machine and extending thereover so as to catch any mist or vapor issuing through the feed and discharge openings, and to also provide a fan or blower for drawing the vapors with air through the hoods and discharging them through a stack or conduit to the atmosphere.

Another object of the invention is to provide means for making the gravity return for the pans inoperative whereby the pans may be removed from the discharge end of the machine, when so desired.

Other objects and advantages of the invention will become apparent as the following description is read on the drawings forming a part of this specification.

The invention consists of a cabinet, a conveyor passing through the cabinet for transporting pans therethrough, a spray chamber above the conveyor, a spray gun mounted in the spray chamber and directed downwardly, an operating arm for the gun provided with a shoe adapted to cooperate with the pans passing through the machine, centering arms at the feed end for directing the pans in a proper course through the machine, a cradle at the discharge end of the conveyor, a locking device for the cradle released by a pan deposited thereon by the conveyor, tipping of the cradle discharging the pan by gravity onto a chute extending under the conveyor and feed table, hoods extending over the feed and discharge ends of the spray chamber, a condenser mounted in the conveyor section, a collecting receptacle beneath the condenser, and a compartment in the bottom of the machine in which the electric motor and compressor with necessary transmission devices are housed.

The invention is adequately illustrated in the accompanying drawings in which similar reference characters are used to designate identical parts throughout the several views, and in which Fig. 1 is a side elevation of the invention with the adjacent wall removed to show the interior construction and equipment.

Fig. 2 is a fragmentary end elevation showing the conveyor and bottom of the hood.

Fig. 3 is a bottom plan view of the centering device with the table top plate removed but showing the slots which are formed in the plate.

Fig. 4 is a top plan view of the discharge cradle.

Fig. 5 is a side elevation of the cradle and showing the locking device.

Fig. 6 is a sectional plan view showing the conveyor and condenser for unused spray.

Fig. 7 is an enlarged fragmentary view showing the interior of the spray chamber and condensing section.

Fig. 8 is an end view of the feed table showing the ridged table and pan centering arms.

Fig. 9 indicates the method of forming the condenser plates.

Fig. 10 shows a fragmentary portion of the assembled condenser core.

Fig. 11 is a plan view of the actuating shoe.

The cabinet consists of a base or bottom 10, sides 11, ends 12 and 13, the upper portions 14 and 15 of which converge upwardly terminating at a cover 16, the converging portions 14 and 15 and cover 16 together with the upper portion of sides 11 forming a spray chamber. The ends 12 and 13 are provided with openings to admit the conveyor and return track and coincidentally forming feed and discharge openings 17 and 18.

The ventilation section consists of a collar 19 provided with openings 20 in the opposite ends and an opening 21 in the top, and is adapted for reception of a stack or conduit to carry away the escaping vapors from the feed and discharge openings 17 and 18 which is conducted through hoods 22 removably attached to the converging ends 14 and 15 of the spray chamber, the hoods being open at the bottom and extending outwardly from and above the feed and discharge openings.

Installed in collar 19 is an electric fan 23 adapted to create an upward draft through hoods 22.

An oil storage tank 24 is also installed in the collar and is provided with an outlet pipe 25 for supplying the spray gun, and may be provided with any convenient means for refilling.

The spray gun 26 may be of any standard make in which a fine mist can be obtained by ejection of a liquid with air and does not form a part of the invention. The gun is suitably mounted with the nozzle 27 pointing downwardly, so as to project a fine mist directly into the pans below. The gun indicated is operated by a trigger 28 which simultaneously admits oil, and air under pressure, to be ejected from the nozzle 27. The outer end of trigger 28 is beveled to cooperate with a diagonal cam 29 which is fixedly secured on an operating arm 30 which in turn is pivotally mounted as at 31 on a support 32.

The oil pipe 25 is connected to the gun in the prescribed manner for the particular type. An air pipe 33 connects to the usual air port on the gun, and may be connected in circuit with any compressed air supply, although the object is to provide an air compressor 34 of any standard make and to be driven by the electric motor 35, these devices being installed in the lower section of the cabinet.

The conveyor consists of the usual sprockets 36 secured on head and tail shafts 37 and 38, which are suitably supported in bearings 39 affixed to the ends 12 and 13 of the cabinet. A sprocket 40 is also secured on shaft 37 and is driven by a chain 41 which cooperates with a sprocket 42 which is mounted on the slow speed shaft 43 of a speed reducer 44, driven by the motor 35. A pair of spaced apart conveyor chains 45 are spanned by a plurality of spaced apart angular members 46 with superposed apex, providing a line contact with the bottom of pans 47, and may consist of small equal leg structural angles secured to the side links of the chains 45. At spaced intervals, one of the angles is mounted with upstanding leg, as shown at 48, to act as pushers for the pans 47. Supports 49, which may consist of angles secured to the sides 11 of the cabinet, slidably support the chains 45, and prevent sagging between the sprockets 36.

The feed table consists of brackets 50, extending outwardly from the front end of cabinet 12, and is provided with a top 51 formed with a plurality of longitudinally extending ridges to provide only line contacts for the pans.

The centering and aligning device for the pans consists of a pair of arms or side members 52, having pins 53 affixed thereto intermediate the length thereof, these pins being pivotally mounted in bearings 54 which are secured to a supporting member 55, this supporting member being fixed to the bracket 50. Secured to the forward end of arms 52 are depending pins 56, these pins extending downwardly through arcuate slots 57 formed in the top 51, these pins being resiliently connected by the tension spring 58, and normally urging the arms into converging relation toward the cabinet, the arms being adapted to receive a pan therebetween and center and align the pan as it is pushed on to the conveyor.

The discharge table or discharge device consists of a bracket 59 supporting a rectangular frame 60, between the side members of which is pivotally mounted a shaft 61, to the top surface of which is secured a plurality of bars 62, the forward ends 63 of which are free, while the rearward ends rest on the inturned leg of the end angle 64, the bars forming a tilting table which is normally retained in a horizontal position and being tiltable by the weight of a pan deposited thereon.

The tilting table is prevented from tilting with the pan until such time as the pan has reached a predetermined position, so as to obviate the tendency of the pan to turn over as it is discharged, and for this means, automatically actuated latching means is provided for cooperation with the pan and actuated by the weight of the pan, and consists of one or more lock bars 66, each of which is pivotally secured, intermediate its length to one of the bars 62, and at a point above the pivot 61 of the bars 62. An aperture 67 is provided in the horizontal leg of the front angle 64 for cooperation with the hook end of the bar 66, this hook end forming a latch. The other end of the bar 66 is angularly formed as shown at 68, the ridge of this end of the bar extending above the bars 62 and 63, so that when a pan is delivered onto the tilting table, it will first cooperate with the bars 62—63, the latch 66 preventing the table from tilting, the weight of the pan as it travels onto the point 68, depressing this portion of the lever and releasing the latch from the aperture 67, which permits the table to tilt, dropping the pan down onto the return chute 70. It will be noted that any tendency of the bars 62—63 to tilt would be prevented by the latch 66 as any tilting motion would be prevented, due to the fact that the pivot 65 is above the center 61 and the pivot 65 would necessarily take an arcuate path and substantially tangential in a horizontal plane, pulling directly on the inside shoulder of the aperture 67. The member 68 actually forms a trigger, to release the latch from the aperture 67 by the weight of a pan, and until this latch is released it is impossible to tilt the tilting table.

Means 69 in the form of a pivoted button is also provided to cooperate with the bars where it is desired to forward the pans directly to discharge instead of returning them to the feed end. Thereby it is possible to forward pans to the machine and remove them therefrom by a single operator without change of position so that the machine can be completely handled by one man. In addition thereto, due to the locking means 69, the discharge table may be fixed in position so that the pans will feed directly over the end of the discharge table, the trigger 68 not interfering with the direct feeding where the table is locked down by the member 69. When the button 69 is turned to inoperative position, the tilting discharge table will automatically function to return the pans to the feed end of the machine.

The return chute consists of a plurality of arcuately formed inverted T members 70 supported between the sides 11 of the cabinet, the arcuately formed end being in cooperative relation to the tilting table, so that a pan discharged by the tilting table will gain sufficient momentum to travel to the forward end of the rails.

The condenser consists of a honeycomb radiator core 71 mounted on supporting angles 72, it being found that a higher percentage of unused spray and vapors was condensed in this type than in the plate type due to the large superficial area exposed to the vapors. The same results may be obtained by the method of construction shown in Figs. 9 and 10, in which a strip of metal is formed as shown in Fig. 9, the strips being assembled in a jig and dip soldered, forming a core as indicated in Fig. 11. This provides a less expensive condenser as the water passages are not required for cooling purposes. A very high efficiency is thus obtained. The actuating shoe is formed of a plurality of spaced longitudinally disposed wires 74 bent upwardly at 75, and secured by means of cross wires 76, welded thereto, a pair of ears 77 being welded to the central cross wires for pivotal suspension on the gun actuating arm 30.

Constructional details of the gun are not shown and no explanation of the operation is made, as the gun, as previously explained, may be of any of the standard makes and does not constitute a part of the invention, but is required for operation of the invention.

The device is operated as follows. The motor 35 is connected in circuit with a source of electrical energy. The motor operates the compressor 34 and also drives the conveyor 45 through a suitable reduction gearing 44. The oil tank 24 is filled with a suitable oil which is delivered to the gun 26 through suitable piping 25, the air under pressure being supplied from the compressor through piping 33. Arm 30 normally is perpendicularly suspended.

A pan is pushed through between the arms 52 which substantially center the pan and guide it as it is deposited on the conveyor, which carries the pan through the machine, and, which on its way through, engages the shoe 74 forcing it back to the position shown in Fig. 1, the cam 29 thus forcing trigger 28 down and opening both oil and air supply valves on the gun 26, directing a fine mist onto the pan, the excess mist being condensed by the condenser 71. As the pan passes beyond a definite point, the shoe is released, the arm 30 swings back and releases the trigger 28 which is resiliently retracted, and which permits closing of the oil and air valves. The pan continues through the machine and is pushed onto the table or bars 62 which are retained in horizontal position until the weight of the pan on the trigger 66 at 68 lifts the catch out of aperture 67. The table bars 62 tip with the weight of the pan which is dropped onto the chute 70, the pan sliding to the forward end 78. Fan 23 draws a current of air upwardly through hoods 22 together with vapors escaping through openings 17 and 18 preventing the dissemination of oil vapor about the room. The condensed oil is collected as condensed, in the collector trough 79 and may be drawn off through the spigot 80 as desired.

Having described an operative method of constructing and operating the device, it will be understood that variations in construction and arrangement of parts which are consistent with the appended claims may be resorted to without detracting from the spirit or scope of the invention or sacrificing any of the advantages thereof.

Features of the device set forth in my copending application Serial No. 412,704, filed under date of December 9, 1929, includes the spray gun and operating means therefore which, though structurally different, is similar in function. This case issued June 7, 1932 under Patent No. 1,862,380.

I claim:—

1. A pan spraying machine comprising in combination with a cabinet, and a conveyor extending through said cabinet; a feed table provided with a pair of resiliently actuated centering arms, a return chute extending through said cabinet beneath said conveyor, and a tipping table cooperating selectively with said conveyor and said chute and actuated by the weight of a pan, and means for locking said tipping table in conveyor cooperative relation whereby the pans may selectively be returned to the feed end or discharged directly at the discharge end.

2. A pan spraying machine comprising a cabinet having intake and discharge openings, pan actuated spraying means in said cabinet, pan centering means, pan transporting means and driving means therefor, automatic tiltable pan discharge means, a return chute adapted to receive a pan from said discharge means, means for locking said discharge means, a spray condenser and an oil collector beneath said transporting means, and vapor removal means adapted to receive vapors escaping through the pan intake and discharge openings in said cabinet, and comprising hoods over said openings and communicating with a discharge collar at the top of said cabinet.

3. A pan spraying machine comprising a cabinet having intake and discharge openings, pan controlled spraying means in said cabinet, vapor removal hoods over said openings in said cabinet and terminating in a discharge collar at the top thereof, air removal means in said collar, a conveyor extending through said openings, a feed table provided with pan centering means at one end of said cabinet, an automatically actuated tilting discharge table at the other end of said cabinet, a return chute adapted to receive a pan from said discharge table, retaining means for said discharge table, and releasing means for said retaining means adapted to cooperate with a pan discharged thereon by said conveyor, and condensing and collecting means for unused spray and vapors from said spraying means.

4. Conveying means for a pan greasing machine comprising a conveyor adapted to transport pans through said machine, a feed table in cooperative relation to the feed end of said conveyor and provided with pan centering and aligning means, a discharge table in cooperative relation to the discharge end of said conveyor, a return chute having an arcuately formed portion in cooperative relation to said discharge table and continuing to the feed end, and means on said discharge table automatically actuated by the weight of a pan received from said conveyor for discharging said pan onto said return chute, said pan being automatically returned to the feed end of said machine beneath said feed table whereby the pans may be fed to the machine and removed therefrom by an operator without change of position.

5. A pan spraying machine, in combination, a cabinet, means for conveying a bread pan in upright position through said cabinet, entrance and exit openings provided in said cabinet for said pan and for said conveying means, a hood projecting over each opening to receive vapors issuing from the openings, a forced draft stack communicating with said hoods, pan controlled spray means in said cabinet adapted to spray the interior of the pan, said cabinet being sealed against the escape of vapors except through said openings, whereby all escaping vapors from the cabinet are directed into the hoods by the reduced pressure created by the forced draft stack.

6. A pan spraying machine, in combination, a cabinet, means for conveying a bread pan in upright position through said cabinet, entrance and exit openings provided in said cabinet for said pan and for said conveying means, a hood projecting over each opening to receive vapors issuing from the openings, a forced draft stack communicating with said hoods, pan controlled spray means in said cabinet adapted to spray the interior of the pan, said cabinet being sealed against the escape of vapors except through said openings, whereby all escaping vapors from the cabinet are directed into the hoods by the reduced pressure created by the forced draft stack, and means for centering and aligning the pan previous to entrance to provide uniform spraying of successive pans.

7. A pan spraying machine, in combination, a cabinet, means for conveying a bread pan in upright position through said cabinet, entrance and exit openings provided in said cabinet for said pan and for said conveying means, a hood projecting over each opening to receive vapors issuing from the openings, a forced draft stack communicating with said hoods, pan controlled spray means in said cabinet adapted to spray the interior of the pan, said cabinet being sealed against the escape of vapors except through said openings, whereby all escaping vapors from the cabinet are directed into the hoods by the reduced pressure created by the forced draft stack, and means for automatically returning the pan to the entrance end of the machine after passage through the cabinet whereby one man operation of the machine is provided.

8. A pan spraying machine, in combination, a cabinet, means for conveying a bread pan in upright position through said cabinet, entrance and exit openings provided in said cabinet for said pan and for said conveying means, a hood projecting over each opening to receive vapors issuing from the openings, a forced draft stack communicating with said hoods, pan controlled spray means in said cabinet adapted to spray the interior of the pan, said cabinet being sealed against the escape of vapors except through said openings, whereby all escaping vapors from the cabinet are directed into the hoods by the reduced pressure created by the forced draft stack, and means for centering and aligning the pan previous to entrance to provide uniform spraying of successive pans, and means for automatically returning the pan to the entrance end of the machine after passage through the cabinet whereby one man operation of the machine is provided.

9. A pan spraying machine, in combination, a cabinet, means for conveying a bread pan in upright position through said cabinet, entrance and exit openings provided in said cabinet for said pan and for said conveying means, a hood projecting over each opening to receive vapors issuing from the openings, a forced draft stack communicating with said hoods, pan controlled spray means in said cabinet adapted to spray the interior of the pan, said cabinet being sealed against the escape of vapors except through said openings, whereby all escaping vapors from the cabinet are directed into the hoods by the reduced pressure created by the forced draft stack, and means for condensing and collecting all vapors except that deposited in the pan or escaping through the openings.

10. A pan spraying machine, in combination, a cabinet, means for conveying a bread pan in upright position through said cabinet, entrance and exit openings provided in said cabinet for said pan and for said conveying means, a hood projecting over each opening to receive vapors issuing from the openings, a forced draft stack communicating with said hoods, pan controlled spray means in said cabinet adapted to spray the interior of the pan, said cabinet being sealed against the escape of vapors except through said openings, whereby all escaping vapors from the cabinet are directed into the hoods by the reduced pressure created by the forced draft stack, and means for centering and aligning the pan previous to entrance to provide uniform spraying of successive pans, and means for condensing and collecting all vapors except that deposited in the pan or escaping through the openings.

11. A pan spraying machine, in combination, a cabinet, means for conveying a bread pan in upright position through said cabinet, entrance and exit openings provided in said cabinet for said pan and for said conveying means, a hood projecting over each opening to receive vapors issuing from the openings, a forced draft stack communicating with said hoods, pan controlled spray means in said cabinet adapted to spray the interior of the pan, said cabinet being sealed against the escape of vapors except through said openings, whereby all escaping vapors from the cabinet are directed into the hoods by the reduced pressure created by the forced draft stack, and means for automatically returning the pan to the entrance end of the machine after passage through the cabinet whereby one man operation of the machine is provided, and means for condensing and collecting all vapors except that deposited in the pan or escaping through the openings.

12. A pan spraying machine, in combination, a cabinet, means for conveying a bread pan in upright position through said cabinet, entrance and exit openings provided in said cabinet for said pan and for said conveying means, a hood projecting over each opening to receive vapors issuing from the openings, a forced draft stack communicating with said hoods, pan controlled spray means in said cabinet adapted to spray the interior of the pan, said cabinet being sealed against the escape of vapors except through said openings, whereby all escaping vapors from the cabinet are directed into the hoods by the reduced pressure created by the forced draft stack, and means for centering and aligning the pan previous to entrance to provide uniform spraying of successive pans, and means for automatically returning the pan to the entrance end of the machine after passage through the cabinet whereby one man operation of the machine is provided, and means for condensing and collecting all vapors except that deposited in the pan or escaping through the openings.

13. A pan greasing machine comprising a closed cabinet provided with a pan entrance opening and a pan exit opening, a stack, forced draft means for said stack, a hood projecting over each opening and communicating with said stack whereby all vapors issuing through the openings are carried to the stack by the hoods, pan conveying means extending through said openings adapted to support said pans in upright position and by line contacts only to prevent coating of the bottom of the pan with the material sprayed, pan controlled spraying means mounted in said cabinet adapted to spray the interior of the pans, pan centering and aligning means in cooperative relation to the pan conveying means and to the pan entrance opening, means for automatically returning the pans, after passage through the machine, to the entrance end of the machine, whereby one operator is capable of feeding the pans to the machine and removing the greased pans without change of position, and means for condensing and collecting all vapors except those deposited in the pan and those escaping through the entrance and exit openings.

14. A pan greasing machine comprising a closed cabinet provided with a pan entrance opening and a pan exit opening, a stack, forced draft means for said stack, a hood projecting over each opening and communicating with said stack whereby all vapors issuing through the openings are carried to the stack by the hoods, pan conveying means extending through said openings adapted to support said pans in upright position and by line contacts only to prevent coating of the bottom of the pan with the material sprayed, pan controlled spraying means mounted in said cabinet adapted to spray the interior of the pans, pan centering and aligning means in cooperative relation to the pan conveying means and to the pan entrance opening, means for automatically returning the pans, after passage through the machine, to the entrance end of the machine, whereby one operator is capable of feeding the pans to the machine and removing the greased pans without change of position, and means for condensing and collecting all vapors except those deposited in the pan and those escaping through the entrance and exit openings, said pan conveying means comprising two strands of chain operating over sprockets and having transverse carrier members formed each of an inverted angle thereby forming a sharp ridge for line contact with the bottom of the pan, and, means for driving said conveying means.

15. A pan greasing machine comprising a closed cabinet provided with a pan entrance opening and a pan exit opening, a stack, forced draft means for said stack, a hood projecting over each opening and communicating with said stack whereby all vapors issuing through the openings are carried to the stack by the hoods, pan conveying means extending through said openings adapted to support said pans in upright position and by line contacts only to prevent coating of the bottom of the pan with the material sprayed, pan controlled spraying means mounted in said cabinet adapted to spray the interior of the pans, pan centering and aligning means in cooperative relation to the pan conveying means and to the pan entrance opening, means for automatically returning the pans, after passage through the machine, to the entrance end of the machine, whereby one operator is capable of feeding the pans to the machine and removing the greased pans without change of position, and means for condensing and collecting all vapors except those deposited in the pan and those escaping through the entrance and exit openings, said pan centering and aligning means comprising a feed table provided with longitudinally extending ridges to provide only line contact with the pan, side members pivoted on a vertical axis and adapted to receive pans therebetween and resiliently retained in converging relation toward the cabinet.

16. A pan greasing machine comprising a closed cabinet provided with a pan entrance opening and a pan exit opening, a stack, forced draft means for said stack, a hood projecting over each opening and communicating with said stack whereby all vapors issuing through the openings are carried to the stack by the hoods, pan conveying means extending through said openings adapted to support said pans in upright position and by line contacts only to prevent coating of the bottom of the pan with the material sprayed, pan controlled spraying means mounted in said cabinet adapted to spray the interior of the pans, pan centering and aligning means in cooperative relation to the pan conveying means and to the pan entrance opening, means for automatically returning the pans, after passage through the machine, to the entrance end of the machine, whereby one operator is capable of feeding the pans to the machine and removing the greased pans without change of position, and means for condensing and collecting all vapors except those deposited in the pan and those escaping through the entrance and exit openings, said pan conveying means comprising two strands of chain operating over sprockets and having transverse carrier members formed each of an inverted angle thereby forming a sharp ridge for line contact with the bottom of the pan, and means for driving said conveying means, said pan centering and aligning means comprising a feed table provided with longitudinally extending ridges to provide only line contact with the pan, side members pivoted on a vertical axis and adapted to receive pans therebetween and resiliently retained in converging relation toward the cabinet.

17. A pan greasing machine comprising a closed cabinet provided with a pan entrance opening and a pan exit opening, a stack, forced draft means for said stack, a hood projecting over each opening and communicating with said stack whereby all vapors issuing through the openings are carried to the stack by the hoods, pan conveying means extending through said openings adapted to support said pans in upright position and by line contacts only to prevent coating of the bottom of the pan with the material sprayed, pan controlled spraying means mounted in said cabinet adapted to spray the interior of the pans, pan centering and aligning means in cooperative relation to the pan conveying means and to the pan entrance opening, means for automatically returning the pans, after passage through the machine, to the entrance end of the machine, whereby one operator is capable of feeding the pans to the machine and removing the greased pans without change of position, and means for condensing and collecting all vapors except those deposited in the pan and those escaping through the entrance and exit openings, said means for automatically returning the pans comprising a rectangular frame having a horizontal member, a shaft pivotally mounted on said frame, a plurality of bars intermediately fixed on said shaft and having one end normally resting on said frame, a lock bar intermediately pivoted to one of the bars above the shaft and having one end projecting above the bars, forming a trigger, the other end forming a latch normally cooperating with an aperture formed in the horizontal member of the frame whereby the weight of a pan releases the catch by depressing the trigger, a return chute in cooperative relation to the bars, the weight of the pan causing the bars to tip when the latch is released, the pan being deposited on the chute and sliding to the entrance end of the machine.

18. A pan greasing machine comprising a closed cabinet provided with a pan entrance opening and a pan exit opening, a stack, forced draft means for said stack, a hood projecting over each opening and communicating with said stack whereby all vapors issuing through the openings are carried to the stack by the hoods, pan conveying means extending through said openings adapted to support said pans in upright position and by line contacts only to prevent coating of the bottom of the pan with the material sprayed, pan controlled spraying means mounted in said cabinet adapted to spray the interior of the pans, pan centering and aligning means in cooperative relation to the pan conveying means and to the pan entrance opening, means for automatically returning the pans, after passage through the machine, to the entrance end of the machine, whereby one operator is capable of feeding the pans to the machine and removing the greased pans without change of position, and means for condensing and collecting all vapors except those deposited in the pan and those escaping through the entrance and exit openings, said pan conveying means comprising two strands of chain operating over sprockets and having transverse carrier members formed each of an inverted angle thereby forming a sharp ridge for line contact with the bottom of the pan, and means for driving said conveying means, said means for automatically returning the pans comprising a rectangular frame having a horizontal member, a shaft pivotally mounted on said frame, a plurality of bars intermediately fixed on said shaft and having one end normally resting on said frame, a lock bar intermediately pivoted to one of the bars above the shaft and having one end projecting above the bars forming a trigger, the other end forming a latch normally cooperating with an aperture formed in the horizontal member of the frame whereby the weight of a pan releases the catch by depressing the trigger, a return chute in cooperative relation to the bars, the weight of the pan causing the bars to tip when the latch is released, the pan being deposited on the chute and sliding to the entrance end of the machine.

19. A pan greasing machine comprising a closed cabinet provided with a pan entrance opening and a pan exit opening, a stack, forced draft means for said stack, a hood projecting over each opening and communicating with said stack whereby all vapors issuing through the openings are carried to the stack by the hoods, pan conveying means extending through said openings adapted to support said pans in upright position and by line contacts only to prevent coating of the bottom of the pan with the material sprayed, pan controlled spraying means mounted in said cabinet adapted to spray the interior of the pans, pan centering and aligning means in cooperative relation to the pan conveying means and to the pan entrance opening, means for automatically returning the pans, after passage through the machine, to the entrance end of the machine, whereby one operator is capable of feeding the pans to the machine and removing the greased pans without change of position, and means for condensing and collecting all vapors except those deposited in the pan and those escaping through the entrance and exit openings, said pan centering and aligning means comprising a feed table provided with longitudinally extending ridges to provide only line contact with the pan, side members pivoted on a vertical axis and adapted to receive pans therebetween and resiliently retained in converging relation toward the cabinet, said means for automatically returning the pans comprising a rectangular frame having a horizontal member, a shaft pivotally mounted on said frame, a plurality of bars intermediately fixed on said shaft and having one end normally resting on said frame, a lock bar intermediately pivoted to one of the bars above the shaft and having one end projecting above the bars forming a trigger, the other end forming a latch normally cooperating with an aperture formed in the horizontal member of the frame whereby the weight of a pan releases the catch by depressing the trigger, a return chute in cooperative relation to the bars, the weight of the pan causing the bars to tip when the latch is released, the pan being deposited on the chute and sliding to the entrance end of the machine.

20. A pan greasing machine comprising a closed cabinet provided with a pan entrance opening and a pan exit opening, a stack, forced draft means for said stack, a hood projecting over each opening and communicating with said stack whereby all vapors issuing through the openings are carried to the stack by the hoods, pan conveying means extending through said openings adapted to support said pans in upright position and by line contacts only to prevent coating of the bottom of the pan with the material sprayed, pan controlled spraying means mounted in said cabinet adapted to spray the interior of the pans, pan centering and aligning means in cooperative relation to the pan conveying means and to the pan entrance opening, means for automatically returning the pans, after passage through the machine, to the entrance end of the machine, whereby one operator is capable of feeding the pans to the machine and removing the greased pans without change of position, and means for condensing and collecting all vapors except those deposited in the pan and those escaping through the entrance and exit openings, said pan conveying means comprising two strands of chain operating over sprockets and having transverse carrier members formed each of an inverted angle thereby forming a sharp ridge for line contact with the bottom of the pan, and means for driving said conveying means, said pan centering and aligning means comprising a feed table provided with longitudinally extending ridges to provide only line contact with the pan, side members pivoted on a vertical axis and adapted to receive pans therebetween and resiliently retained in converging relation toward the cabinet, said means for automatically returning the pans comprising a rectangular frame having a horizontal member, a shaft pivotally mounted on said frame, a plurality of bars intermediately fixed on said shaft and having one end normally resting on said frame, a lock bar intermediately pivoted to one of the bars above the shaft and having one end projecting above the bars forming a trigger, the other end forming a latch normally cooperating with an aperture formed in the horizontal member of the frame whereby the weight of a pan releases the catch by depressing the trigger, a return chute in cooperative relation to the bars, the weight of the pan causing the bars to tip when the latch is released, the pan being deposited on the chute and sliding to the entrance end of the machine.

21. In combination with a pan greasing machine; pan centering and aligning means adapted to provide uniform spraying of successive pans, comprising a feed table provided with longitudinally extending ridges to provide only line contact, with the pan, side members pivoted on a vertical axis and adapted to receive pans therebetween, and resiliently retained in converging relation toward the cabinet.

22. In combination with a pan greasing machine; means for automatically returning the pans comprising a rectangular frame having a horizontal member, a shaft pivotally mounted on said frame, a plurality of bars intermediately fixed on said shaft and having one end normally resting on said frame, a lock bar intermediately pivoted to one of the bars above the shaft and having one end projecting above the bars forming a trigger, the other end forming a latch normally cooperating with an aperture formed in the horizontal member of the frame whereby the weight of a pan releases the catch by depressing the trigger, a return chute in cooperative relation to the bars, the weight of the pan causing the bars to tip when the latch is released, the pan being deposited on the chute and sliding to the entrance end of the machine.

23. In combination with a pan greasing machine; line contact pan conveying means comprising two strands of chain operating over sprockets and having transverse carrier members formed each of an inverted angle thereby forming a sharp ridge for line contact with the bottom of the pan, and means for driving said conveying means, pan centering and aligning means comprising a feed table provided with longitudinally extending ridges to provide only line contact with the pan, side members pivoted on a vertical axis and adapted to receive pans therebetween and resiliently retained in converging relation toward the cabinet, and means for automatically returning the pans comprising a rectangular frame having a horizontal member, a shaft pivotally mounted on said frame, a plurality of bars intermediately fixed on said shaft and having one end normally resting on said frame, a lock bar intermediately pivoted to one of the bars above the shaft and having one end projecting above the bars forming a trigger, the other end forming a latch normally cooperating with an aperture formed in the horizontal member of the frame whereby the weight of a pan releases the catch by depressing the trigger, a return chute in cooperative relation to the bars, the weight of the pan causing the bars to tip when the latch is released, the pan being deposited on the chute and sliding to the entrance end of the machine.

24. In combination with a pan greasing machine; pan centering and aligning means adapted to provide uniform spraying of successive pans, comprising a feed table provided with longitudinally extending ridges to provide only line contact with the pan, side members pivoted on a vertical axis and adapted to receive pans therebetween, and resiliently retained in converging relation toward the cabinet, and means for automatically returning the pans comprising a rectangular frame having a horizontal member, a shaft pivotally mounted on said frame, a plurality of bars intermediately fixed on said shaft and having one end normally resting on said frame, a lock bar intermediately pivoted to one of the bars above the shaft and having one end projecting above the bars forming a trigger, the other end forming a latch normally cooperating with an aperture formed in the horizontal member of the frame whereby the weight of a pan releases the catch by depressing the trigger, a return chute in cooperative relation to the bars, the weight of the pan causing the bars to tip when the latch is released, the pan being deposited on the chute and sliding to the entrance end of the machine.

In testimony whereof I have affixed my signature.

SVEN P. LARSON.